United States Patent [19]

Possati et al.

[11] 4,385,444
[45] May 31, 1983

[54] PLUG COMPARATOR FOR CHECKING THE DIAMETER OF HOLES

[75] Inventors: Mario Possati; Guido Golinelli, both of Bologna; Narciso Selleri, Monteveglio, all of Italy

[73] Assignee: Finike Italiana Marposs, S.p.A., S. Marino di Bentivoglio, Italy

[21] Appl. No.: 268,579

[22] Filed: May 29, 1981

[30] Foreign Application Priority Data

Jun. 2, 1980 [IT] Italy ................... 3438 A/80

[51] Int. Cl.³ .................. G01B 5/12; G01B 7/12
[52] U.S. Cl. .................. 33/143 L; 33/147 K; 33/178 E
[58] Field of Search ............ 33/143 L, 147 K, 147 N, 33/178 B, 178 E

[56] References Cited

U.S. PATENT DOCUMENTS

| | | | |
|---|---|---|---|
| 3,943,632 | 3/1976 | Albertazzi | 33/174 L |
| 3,958,338 | 5/1976 | Anichini et al. | 33/143 L |
| 4,067,114 | 1/1978 | Meyer, Jr. | 33/178 E |
| 4,290,204 | 9/1981 | Possati | 33/143 L |
| 4,329,782 | 5/1982 | Possati et al. | 33/147 K |

FOREIGN PATENT DOCUMENTS

| | | | |
|---|---|---|---|
| 1010553 | 4/1974 | Italy | 33/178 E |
| 265461 | 3/1970 | U.S.S.R. | 33/143 L |

*Primary Examiner*—Richard R. Stearns
*Attorney, Agent, or Firm*—Stevens, Davis, Miller & Mosher

[57] ABSTRACT

A plug comparator for checking the diameter of holes in mechanical parts, having a movable measurement unit comprising two movable arms bearing respective feeler elements which come into contact with the part to be checked. A position transducer detects the position of the movable arms and is connected by an electrical cord to an electrical supply and indication group. The movable unit comprises a single member of stamped plate having two portions which constitute the arms. The two portions have two sets for the ends of a spring which act on the arms, two seats for two mutually movable elements of the transducer, seats for the feeler elements and for devices for locking the feeler elements, and stop elements which limit the movements of the arms towards each other.

7 Claims, 12 Drawing Figures

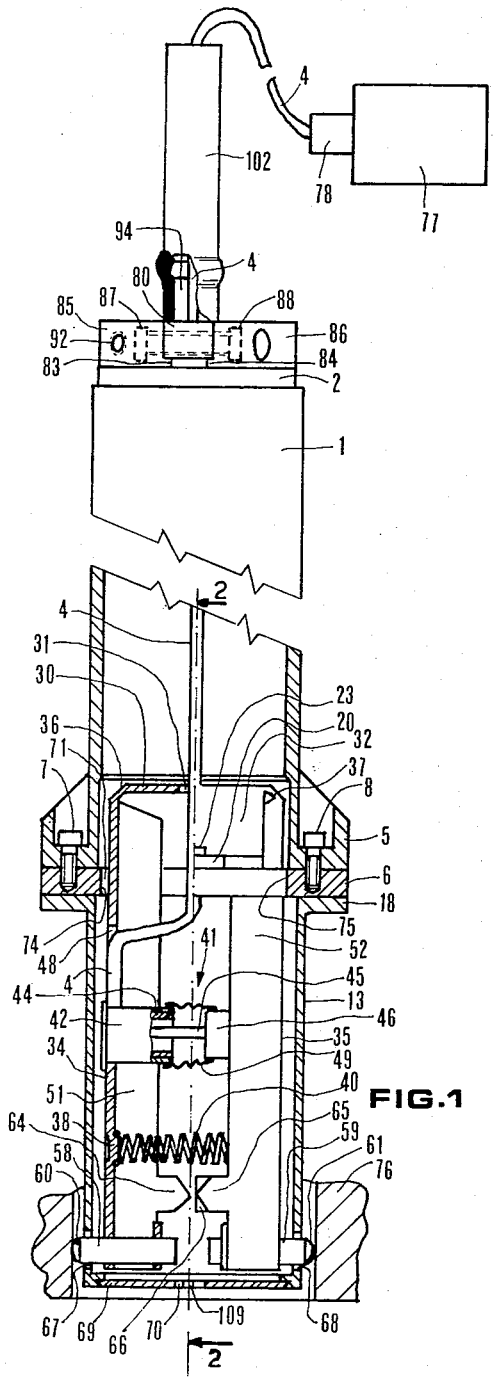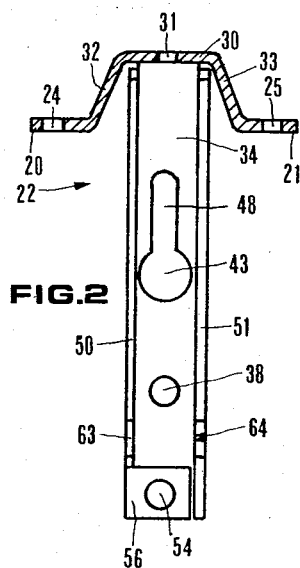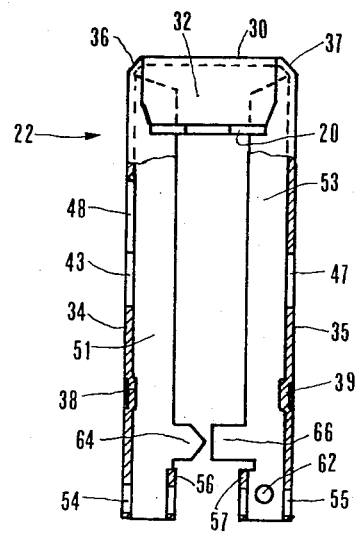

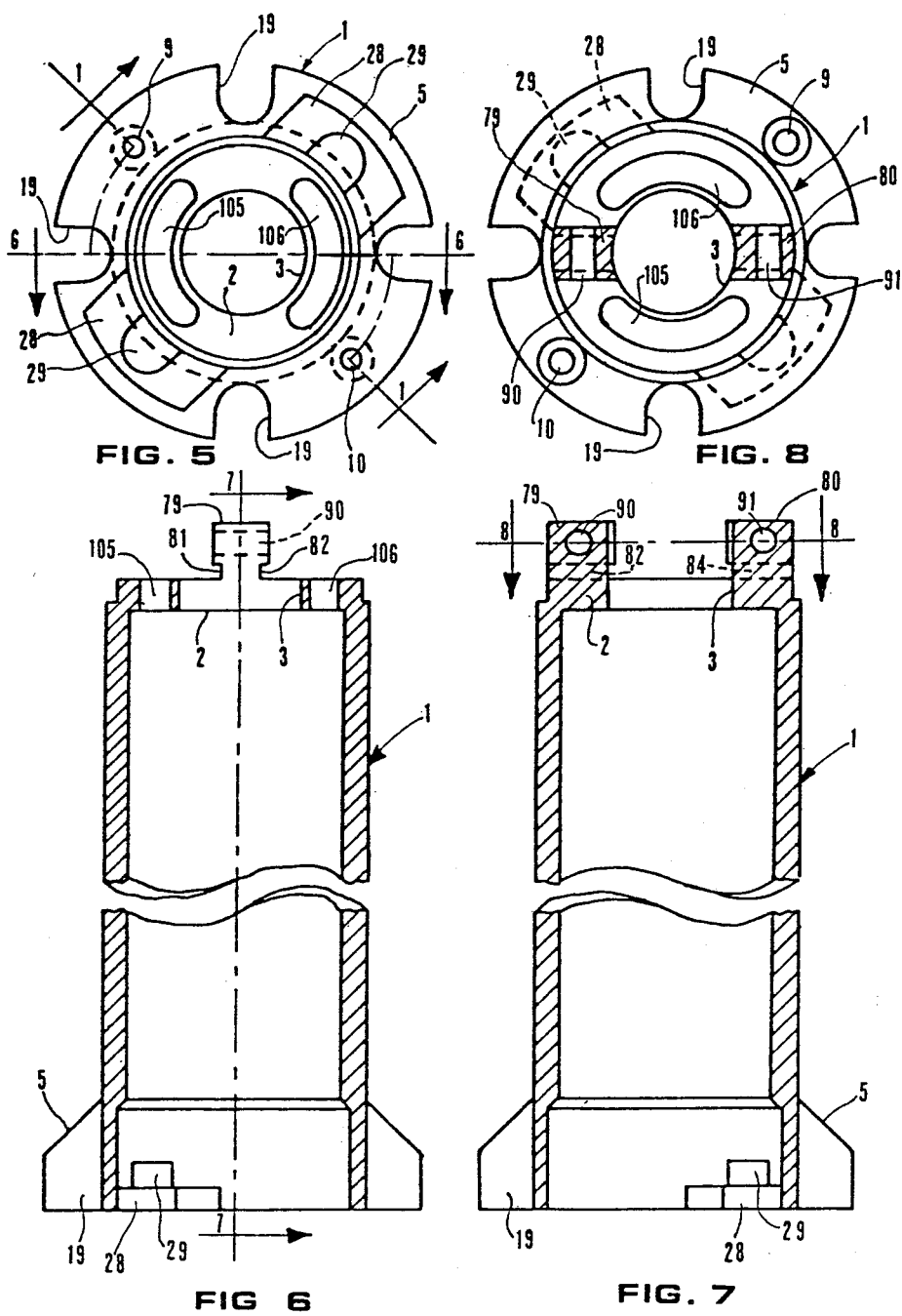

PLUG COMPARATOR FOR CHECKING THE DIAMETER OF HOLES

The present invention relates to a comparator for checking linear dimensions of mechanical parts, having support means, two movable arms supported by the support means and bearing respective feeler elements adapted to contact the part to be checked, two fulcrums adapted to permit rotation of the movable arms with respect to the support means, a spring acting on the arms, and a position transducer having two parts fastened to the movable arms.

In particular the invention relates to a plug comparator for checking radial dimensions of holes.

BACKGROUND OF THE INVENTION

Plug comparators for the bench checking of holes of mechanical parts are already known.

For example, in Italian Patent 1,010,553 there is described a plug comparator for the manual checking of holes which comprises two movable arms bearing at one end two feeler elements and at the other end two mutually movable parts of a transducer. The movable arms are fastened at intermediate points to an element fastened to the frame of the comparator comprising two thin flexible sections which act as fulcrums. The comparator furthermore has a casing for the centering of the comparator in the hole and for the protection of the movable arms and of the feeler elements.

Important requirements of a comparator, in particular of a bench comparator, are, in addition to the precision and the reproducibility of the measurements, low cost of production, maintenance and repair, strength, and the possibility of adapting the comparator to different measurement ranges.

SUMMARY OF THE INVENTION

The technical problem which the present invention proposes to solve is to provide a comparator, particularly for manual applications, which is of lower cost than the known comparators due to a very simple structure composed of a rather limited number of parts and which at the same time insures increased strength, flexibility and ease of use.

This problem is solved by a comparator of the type indicated at the beginning of the present specification in which, in accordance with the invention, the support means, arms and fulcrums comprise a single member having a support part, two elastically yieldable sections which define the fulcrums, and two portions which define the arms, the two portions defining the arms having seats for the ends of the spring, seats for housing the two parts of the transducer, seats for the feeler elements, and stop elements for limiting the movements of the arms towards each other.

BRIEF DESCRIPTION OF THE DRAWINGS

Other characteristics and advantages of the invention will become evident from the following detailed description, read with reference to the accompanying drawings, which have been given solely by way of illustration and not of limitation, in which:

FIG. 1 shows a manual plug comparator in accordance with the preferred embodiment of the invention taken along line 1—1 of FIG. 5;

FIG. 2 is a longitudinal sectional view through a movable unit of the comparator of FIG. 1 along line 2—2 of FIG. 1;

FIG. 3 is a side elevational view partially in section of the movable unit of the comparator of FIGS. 1 and 2;

FIG. 5 is a bottom view of the handle of the comparator in accordance with FIG. 1;

FIG. 6 is a longitudinal sectional view through the handle along the line 6—6 of FIG. 5;

FIG. 7 is a longitudinal sectional view through the handle along the line 7—7 of FIG. 6;

FIG. 8 is a horizontal section seen from above through the handle along the line 8—8 of FIG. 7;

Referring to FIGS. 1 to 8, the manual plug comparator comprises a handle 1, preferably of plastic material, having an upper base 2 which is perpendicular to the longitudinal axis of the comparator and has a central aperture or hole 3 (FIG. 6) for the passage of an electrical cord 4. The handle 1, which is hollow, has substantially cylindrical inner and outer surfaces coaxial with the longitudinal axis of the comparator. The lower portion of the handle 1 terminates in a flange 5 which serves to connect the handle to a support element, consisting essentially of a perforated plate 6. The connection between the flange 5 and the plate 6 is effected by means of two screws 7, 8 which pass through holes 9, 10 in the flange 5 (FIG. 5) and are threaded into threaded holes 11, 12 of the plate 6 (FIG. 4) so as to clamp the lower face of the flange 5 to the upper face of the plate 6.

Figure 4:
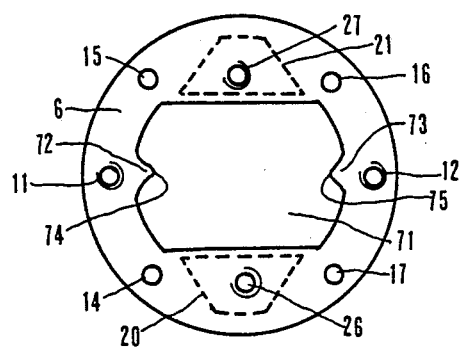
FIG. 4 is a plan view of a support element of the comparator of FIG. 1.

The plate 6 furthermore supports a protection and centering casing 13 by means of four screws, not visible in the drawing, which pass through holes 14, 15, 16, 17 of the plate 6 and are threaded in threaded holes, not visible in the drawing, provided in a flange 18 of the casing 13, in such a manner that the upper face of the flange 18 is clamped to the lower face of the plate 6. The four fastening holes of the flange 18 are accessible through openings 19 in the flange 5 (FIG. 5).

The plate 6 furthermore acts as a support element for the movable unit of the comparator. To the upper face of the plate 6 there are connected the lower faces of two flanges 20, 21 (FIGS. 2, 3) which form a single body 22 with the movable unit. The connection is effected by means of two screws, one of which, 23, is visible in FIG. 1, passing through holes 24, 25 in the flanges 20, 21 and which are threaded into threaded holes 26, 27 of the plate 6. In the flange 5 there are provided seats 28, 29 for housing the flanges 20, 21 and the screws 23 (FIG. 5).

The flanges 20, 21, shown partially in dashed line in FIG. 4, are opposite each other with respect to the vertical plane passing through the axis of the comparator and through the axes of the holes 11 and 12.

The body 22, which is obtained by bending a plate of spring steel, furthermore comprises an upper base 30 of substantially rectangular perimeter and with a hole 31 for the passage of the electrical cord 4, two connecting parts 32, 33 between the flanges 20, 21 and the base 30, and two movable arms 34, 35. The arms 34, 35 are obtained by bending two flanges from the steel plate and are connected with the upper base 30 by two portions 36, 37 which are lightened by chamfers, as can be noted from FIGS. 1 and 3, which form two fulcrums for the rotation of the arms 34, 35 around respective axes perpendicular to the arms.

The arms 34, 35 whose structure is substantially the same, have a C-shaped cross section (FIGS. 1 to 3) so as to assure high resistance to flexure and, in their central sides, have two cylindrical portions 38, 39 which protrude slightly towards the inside. The portions are produced by semi-cutting.

The two cylindrical portions 38, 39 constitute housing and stop seats for the ends of a spring 40. The spring 40 works in compression and therefore tends to open the arms 34, 35. The mutual position of the two arms 34, 35 is detected by means of a position transducer 41 with a differential transformer.

The transducer 41 comprises a cylindrical housing 42 inserted into a hole 43 of the arm 34 and fastened to the arm 34 by cementing.

The housing 42 contains within it the primary and secondary windings of the differential transformer. Within the windings 44 there is movable, as a result of the mutual displacements of the arms 34, 35, a magnetic core (not shown) supported by a shaft 45 integral with a cylinder 46 fastened to the arm 35. The cylinder 46 is inserted into a hole 47 of the arm 35 and is fastened to the arm 35 by cementing. The electrical cord 4, which is connected to the windings 44, emerges laterally from the housing 42 and passes through an opening 48 in the arm 34 communicating with the hole 43. An elastic bellows gasket 49 having its ends fastened to the cylinder 46 and to the housing 42 assures tightness within the transducer 41.

The arms 34, 35, as already stated, are of C-shaped cross section and therefore have bent limbs 50, 51, 52, 53. The arms 34, 35 house at their free ends, in suitable holes 54, 55 passing through further bent flanges 56, 57, cylinders 58, 59 which bear feelers 60, 61, respectively. The cylinders 58, 59 are locked by screws with hollow hexagonal heads, not visible in the drawing, threaded into threaded rivets, also not visible in the drawing, fastened to the arms 34, 35 and passing through a hole provided in the limb 50 and a hole 62 provided in the limb 53. By acting on these screws it is possible to adjust the position of the feeler elements or of the cylinders 58, 59 bearing the feelers 60, 61 in the radial direction of measurement.

The limbs 50, 51 of the arm 34 have two protruding parts 63, 64, the first thereof terminating with a substantially vertical flat side and the second with a horizontal narrow edge. Similarly, the limbs 52, 53 have two protruding parts 65, 66, the first thereof terminating with a horizontal narrow edge and the second with a substantially vertical flat side. The protruding parts 63, 64, 65, 66 which correspond to the member 22 constitute stop elements which limit the displacement of the arms 34, 35 towards each other. As a matter of fact, the free ends of the protruding parts 63, 64 face the respective free ends of the protruding parts 65, 66 with which they come into contact in a position of the arms 34, 35 such as to eliminate the danger of damaging the portions 36, 37 and/or the transducer 41. The sharp-edged shape of the protruding parts 64, 65 reduces the possible drawbacks resulting from the possible depositing of foreign matter such as dust, grease and chips and guarantees a position of maximum relative closeness of the arms 34, 35 which is substantially constant.

The casing 13 has holes 67, 68 for the passage of the feelers 60, 61 and is closed on the bottom by a circular base or plate 69 perpendicular to the axis of the comparator. The plate 69 which is fastened to the casing 13 in a manner which will be described further below, has a central hole 70.

The plate 6 (FIG. 4) is of substantially ring shape with a central hole 71 and has two inward protruding parts 72, 73 having approximately the shape of triangular prisms with chamfered vertices 74, 75. The two parts 72, 73, which are diametrically opposite each other in a direction perpendicular to that in which the two flanges 20, 21 are arranged, form stop surfaces adapted to limit the opening stroke of the arms 34, 35. As a matter of fact, as can be noted also from FIG. 1, the arms 34, 35 pass through the hole 71 since the base 30 and the free end of the arms are on opposite sides of the plate 6. At the level of the plate 6, the central part of the C-shaped section of the arms 34, 35 is adjacent the vertices 74, 75.

Therefore, if the part 76 shown in FIG. 1 is removed, the opening movement caused by the spring 40 is limited due to the contact of the central part of the C-shaped cross section of the arms 34, 35 with the vertices 74, 75.

On the other hand, when the casing 13 is introduced into a hole of a part 76 to be checked, the feelers 60, 61, which in condition of rest protrude with respect to the surface of the casing 13 by a predetermined amount, cause the arms 34, 35 to close, bringing them into measurement position, and it is possible to read from an instrument of a supply and detection group 77, connected to a connector 78 fastened to the end of the electrical cord 4, the difference between the diameter of the hole and the value of the diameter of a sample part by which, as is customary, the zero setting of the comparator is effected.

From the above description it can be noted that a single element, namely the plate 6, acts both as central support to which there are connected the handle 1, the arms 34, 35 (via the intermediate support element comprising the flanges 20, 21, the base 30 and the lightened sections 36, 37) and the casing 13 and as a limiter of the opening stroke of the arms 34, 35.

The limiting of the opening stroke is obtained, as described above, by two parts of the plate or ring 6 which protrude towards the inside and which, terminating with substantially sharp-edged surfaces, define stop surfaces of small size, so as to eliminate the influence of foreign elements which may tend to deposit on the arms 34, 35 or on the stop surfaces 74, 75 and to assure a limiting of the opening stroke to a constant value. The vertices which constitute the stop surfaces may be more or less beveled or sharp, depending on the shape of the arms 34, 35.

The handle 1, above the upper base 2, has two tangs 79, 80 of substantially prismatic shape but with two faces having the shape of parts of cylindrical surfaces of the same diameter as the base 2 of the handle 1. In the lower part of the tang 79 there are provided two opposite undercuts 81, 82 (FIGS. 6, 7). Similar undercuts 83, 84 are provided in the tang 80 (FIGS. 1 and 7).

Figure 9:
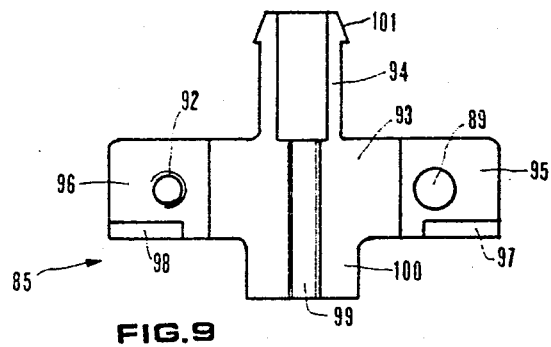
FIG. 9 is a vertical view, on a larger scale, of an element of a cord-holder device of the comparator of FIG. 1.
Figure 10:
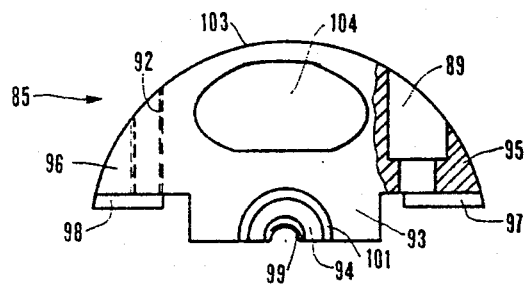
FIG. 10 is a plan view, partially in section, of the element of FIG. 9.

The comparator furthermore comprises a cordholder device consisting of two elements 85, 86 which are clamped by screws 87, 88 against the tangs 79, 80, as is visible in FIG. 1. The screw 87 passes through a hole 89 in the element 85 (FIGS. 9, 10), a hole 90 in the tang 79 and is screwed into a threaded hole of the element 86. In similar manner, the screw 88 passes through a hole in the element 86 and a hole 91 in the tang 80 and is screwed into a threaded hole 92 of the element 85.

The element 85, which is identical to the element 86, comprises central body 93, a semitubular part 94 and two lateral arms 95, 96. The arms 95, 96 in which holes 89, 92 are present have two teeth 97, 98 adapted to be inserted into the undercuts 81, 83 of the tangs 79, 80, which define stop surfaces cooperating with the teeth 97, 98 so as to prevent displacement of the element 85 in the axial direction of the comparator. Within the central body 93 there is provided a semicylindrical threaded seat 99 coaxial with the semitubular part 94.

When the cord-holder device is mounted, the threaded seat 99 and the corresponding seat of the element 86 grip onto the jacket of the cord 4 which is thus locked in a threaded hole. The crests of the threads penetrate into the jacket so as to prevent displacement of the cord 4 with respect to the cord-holder device in the handle 1. The lower part 100 of the body 93 and the corresponding part of the body of the element 86 remain housed within the hole 3 of the handle while the lower faces of the lateral arms 95, 96 of the element 85 and the corresponding ones of the element 86 rest against the base 2 of the handle 1.

The semitubular part 94 and the corresponding part of the element 86 are placed together to form an internal hole aligned with the threaded hole formed by the threaded seats of the elements 85, 86. This inner hole has a diameter such that its surface does not grip the jacket of the cord 4. The upper end of the semitubular part 94 terminates with an outer surface 101 having the form of a semifrustoconical surface with a lower base protruding with respect to the outer underlying surface of the semitubular part 94.

Over the outer surface 101 defined by the semitubular part 94 and by the corresponding semitubular part of the element 86 there is placed a flexible rubber tube 102 which is locked by the frustoconical surface defined by the elements 85, 86. The tube 102 serves to rigidify the cord 4, avoiding possible breaks of its jacket in the immediate vicinity of the cord-holder device.

The structure of the cord-holder device is such as to prevent damage to the wires of the cord 4 and to prevent mechanical stresses exerted on the cord from the outside of the comparator from being transmitted to the part of the cord contained within the handle 1 and from the part of the cord to the movable arm 34.

As a matter of fact the two elements 85, 86 of the cord-holder device cannot move either axially due to the teeth 97, 98 or transversely, due to being abutted against the tangs 79, 80.

The element 85 (and thus also the element 86) has an outer surface 103 which constitutes part of a cylindrical surface of a diameter corresponding to that of the base 2 of the handle, so that the transverse size of the cord-holder device and of the tangs 79, 80 is equal to that of the base 2. In the element 85 there is a hole 104 of substantially elliptical section which communicates with a hole 105 provided in the upper base 2 of the handle 1. Another hole 106 provided in the base 2 symmetrical with respect to the hole 105 and adjacent, like hole 105, to the central hole 3 communicates with a hole present in the element 86 corresponding to hole 104.

The presence of the holes 70, 71, 104, 105, 106 makes it possible to clean the inside of the comparator without it being necessary to remove any part. As a matter of fact, by means of a nozzle inserted through the hole 70 it is possible to introduce air or other suitable fluid under pressure within the protective and support housing formed by the casing 13 with the plate 69, plate 6 and handle 1. The air flows within the plug substantially from the bottom to the top, passing through the inside of the casing 13, hole 17 and handle 1. The air flow removes any foreign matter and discharges towards the outside together with the foreign matter through the holes 104, 105, 106. The air discharges in part also through the free annular spaces defined by the cylinders 58, 59, and by the surfaces of the holes 67, 68. The simplicity of this cleaning operation is such that it can be repeated frequently in such a manner as to have assurance that the parts thereof critical for the operation, such as the cylinders 58, 59, the stop surfaces 74, 75, the stop surfaces defined by the parts 63, 64, 65, 66, the arms 34, 35, the spring 40 and the portions 36, 37, do not accumulate foreign matter in such an amount as to jeopardize the precision and reproducibility of the measurements, or cause oxidation of the surfaces. The transducer 41 being tightly closed by the gasket 49, does not suffer from this cleaning operation with compressed air.

The hole 3 in the handle 1 has a diameter such as to permit, after the disconnection of the connector 78 from the group 77, the dismounting of the cord-holder device and the unscrewing of the screws 7, 8, withdrawal of the handle 1 by passing over the cord 4 and the connector 78. In this way the assembly and disassembly of the comparator are facilitated and it is possible to assemble the comparator by easily and rapidly connecting its various assembled components together, one of which is the handle and another of which is the movable unit provided with transducer, cord and connector.

If mechanical stresses are applied to the handle 1 and to the part of the cord 4 which emerges from same through the cord-holder device, these stresses are not transmitted to the movable measurement unit since the stresses act only on the plate 6 and on the cord holder device. This also is important from the standpoint of the reproducibility of the measurements effected by the comparator.

Figure 11:
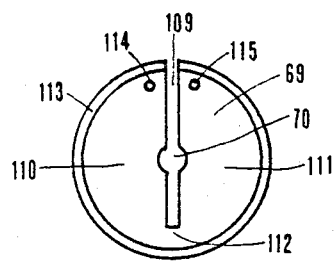
FIG. 11 is a plan view from below of a base plate of the comparator in accordance with FIG. 1.
Figure 12:
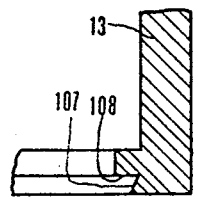
FIG. 12 shows, on a larger scale, a detail of the casing of the comparator of FIG. 1.

Referring to FIGS. 1, 11 and 12, there will now be described in detail the structure of the plate 69 and its connection to the casing 13.

The casing 13, is provided at its lower base with a frustoconical seat 107 above which there is an annular stop surface 108. The plate 69 has a cut 109 in diametral direction passing through the hole 70. The cut 109 divides the plate 69 into two adjacent portions 110, 111, connected by a third portion 112 having a length which is sufficiently limited so that the third portion 112 is elastically yieldable to permit bringing the adjacent portions 110, 111 together, thereby reducing the width of the free zone produced by the cut 109. The side surface 113 of the plate 69 is of frustoconical shape with minimum and maximum diameters slightly greater (in condition of rest of the portion 112) than the corresponding ones of the frustoconical seat 107. With a fork-shaped device, not shown, having two tines which are inserted into two holes 114, 115 provided in the two portions 110, 111 in the vicinity of the free end of the cut 109, the two portions 110, 111 can be brough together so as to be able to insert the plate 69 within the seat 107. Thereupon the device is acted on in such a manner as to permit the two portions 110, 111 to move away from each other. The device then is removed from the holes 114, 115, thus leaving the plate 69 clamped in the seat 107.

In the same manner the plate 69 can be removed from the casing 13.

The structure of the plate 69 and the system for the fitted connection between the casing 13 and the plate 69 are therefore very simple and economical and make it possible to effect the assembly and disassembly operations with great speed, facilitating access to the inside of the casing 13, and in particular to the screws 58, 59. The width of the cut 109 can be sufficiently small so that the presence of the cut 109 does not appreciably affect the cleaning operation described above.

What is claimed is:

1. A comparator for checking linear dimensions of mechanical parts, having first support means, second support means fixed to the first support means, two movable arms supported by the second support means and bearing respective feeler elements adapted to feel the part to be checked, two fulcrums adapted to permit a motion of rotation of the movable arms with respect to the second support means, a spring having ends acting on the arms and a position transducer having two parts fastened to the movable arms, said second support means, arms and fulcrums being parts of an integral member formed of an element of stamped plate, said integral member having a support part defining the second support means, two elastically yieldable sections which define the fulcrums and two portions which define the arms, the two portions defining seats for directly housing the ends of the spring, seats to house the two parts of the transducer, seats for the feeler elements and stop elements integral with the arms for limiting the displacements of the arms towards each other, said stop elements comprising two protruding portions, one of the protruding portions terminating with an edge and the other protruding portion terminating with a flat surface.

2. A comparator for checking linear dimensions of mechanical parts, having support means, two movable arms supported by the support means and bearing respective feeler elements adapted to feel the part to be checked, two fulcrums adapted to permit a motion of rotation of the movable arms with respect to the support means, a spring acting on the arms and a position transducer having two parts fastened to the movable arms, said support means, arms and fulcrums comprising a single member having a support part, two elastically yieldable sections which define the fulcrums and two portions which define the arms, the two portions having seats for the ends of said spring, seats to house the two parts of the transducer, seats for the feeler elements and stop elements for limiting the displacements of the arms towards each other, said single member being formed of an element of stamped plate, said portions defining the arms having substantially C-shaped cross-sections, the seats for the ends of the spring being formed of two stop surfaces obtained by half-cutting in the central parts of the C-shaped sections, said arms defining holes in said central parts to provide seats for the two parts of the transducer and for the feeler elements.

3. The comparator according to claim 2, wherein said stop elements are formed of parts protruding from the lateral parts of said C-shaped sections.

4. The comparator according to claim 3, wherein said stop elements comprise two protruding portions in each of said lateral parts, one of the protruding portions terminating with an edge and the other with a flat surface, the protruding part which terminates with an edge being adapted to cooperate with the protruding part with the flat surface of the other arm.

5. The comparator according to one of claims 2 to 4, wherein said portions which define the arms comprise two bent limbs which have holes to house the feeler elements.

6. The comparator according to claim 5, including means for locking the feeler elements, said portions which define the arms having holes for housing said means.

7. The comparator according to one of claims 2 to 4, wherein said parts of the transducer are fastened to said central parts of the C-shaped sections by cementing.

* * * * *